United States Patent
Zhang

(10) Patent No.: US 10,218,983 B2
(45) Date of Patent: Feb. 26, 2019

(54) ADAPTING MODE DECISIONS IN VIDEO ENCODER

(71) Applicant: Apple Inc., Cupertino, CA (US)

(72) Inventor: Lei Zhang, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 634 days.

(21) Appl. No.: 14/870,925

(22) Filed: Sep. 30, 2015

(65) Prior Publication Data

US 2017/0094283 A1    Mar. 30, 2017

(51) Int. Cl.
  *H04N 19/147*  (2014.01)
  *H04N 19/156*  (2014.01)
  *H04N 19/107*  (2014.01)

(52) U.S. Cl.
  CPC ......... *H04N 19/147* (2014.11); *H04N 19/107* (2014.11); *H04N 19/156* (2014.11)

(58) Field of Classification Search
  None
  See application file for complete search history.

(56) References Cited

U.S. PATENT DOCUMENTS

| | | | |
|---|---|---|---|
| 7,912,123 B2 * | 3/2011 | Ziauddin | H04N 19/176 375/240.05 |
| 8,804,836 B2 | 8/2014 | Nilsson et al. | |
| 9,106,888 B2 | 8/2015 | Chou | |
| 9,215,472 B2 | 12/2015 | Orr et al. | |
| 9,218,639 B2 | 12/2015 | Cote et al. | |
| 9,224,186 B2 | 12/2015 | Rygh et al. | |
| 9,224,187 B2 | 12/2015 | Cote et al. | |
| 9,270,999 B2 | 2/2016 | Cote et al. | |
| 9,292,899 B2 | 3/2016 | Schaub et al. | |
| 9,299,122 B2 | 3/2016 | Okruhlica et al. | |
| 9,305,325 B2 | 4/2016 | Cheng et al. | |
| 9,336,558 B2 | 5/2016 | Cote et al. | |
| 9,351,003 B2 | 5/2016 | Cote et al. | |
| 9,380,312 B2 | 6/2016 | Cote et al. | |

(Continued)

OTHER PUBLICATIONS

Guilherme Correa, et al.; "Low-Complexity HierarchicalMode Decision Algorithms Targeting VLSI Architecture Design for the H.264/AVC Video Encoder"; Hindawi Publishing Corporation, VLSI Design, vol. 2012, Article ID 748019, 20 pages.

*Primary Examiner* — Anand S Rao
*Assistant Examiner* — Tyler B Edwards
(74) *Attorney, Agent, or Firm* — Fletcher Yoder PC

(57) ABSTRACT

System and method for improving operational efficiency of a video encoding pipeline used to encode image data. In embodiments, the video encoding pipeline includes mode decision circuitry that determines a frame prediction mode. The mode decision circuitry includes distortion measurement circuitry, which selects a distortion measurement calculation based at least in part on operational parameters of a display device and the image data. Further, the video encoding pipeline includes mode selection circuitry that determines rate distortion cost metrics associated with an inter-frame prediction mode and an intra-frame prediction mode using the distortion measurement calculation. Additionally, the mode selection circuitry selects between the inter-frame prediction mode and the intra-frame prediction mode based at least in part on the rate distortion cost metrics.

19 Claims, 6 Drawing Sheets

(56) References Cited

U.S. PATENT DOCUMENTS

| | | |
|---|---|---|
| 2012/0327998 A1* | 12/2012 | Nilsson ................ H04N 19/176 |
| | | 375/240.02 |
| 2013/0089137 A1 | 4/2013 | Korman et al. |
| 2015/0092833 A1 | 4/2015 | Ku et al. |
| 2015/0092843 A1 | 4/2015 | Millet et al. |
| 2015/0092855 A1 | 4/2015 | Chou et al. |
| 2015/0172662 A1 | 6/2015 | Pearson |
| 2015/0181208 A1* | 6/2015 | Park ................ H04N 19/00206 |
| | | 375/240.02 |
| 2016/0007038 A1 | 1/2016 | Chou et al. |
| 2016/0021385 A1 | 1/2016 | Chou et al. |
| 2016/0065969 A1 | 3/2016 | Cheng et al. |
| 2016/0065973 A1 | 3/2016 | Cote et al. |

\* cited by examiner

ADAPTING MODE DECISIONS IN VIDEO ENCODER

BACKGROUND

This disclosure relates generally to video encoding and, more particularly, to dynamically altering mode decisions used in video encoding.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

An electronic device may present visual representations of information as image frames displayed on an electronic display based on image data. Since image data may be received from another electronic device, such as a camera, or retrieved from storage on the electronic device, video image data may be encoded (e.g., compressed) to reduce size (e.g., number of bits) and, thus, resources (e.g., transmission bandwidth and/or memory) used to transmit and/or store image data. To display image frames, the electronic device may decode image data that has been encoded and instruct the electronic display to adjust luminance of display pixels based on the decoded image data.

To facilitate encoding, prediction modes may be used to indicate the image data by referencing other image data. For example, since successively displayed image frames may be generally similar, inter-frame prediction techniques may be used to indicate image data (e.g., a prediction unit) corresponding with a first image frame by referencing image data (e.g., a reference sample) corresponding with a second image frame, which may be displayed directly before or directly after the first image frame. To facilitate identifying the reference sample, a motion vector may indicate position of a reference sample in the second image frame relative to location of a prediction unit in the first image frame. In other words, instead of directly compressing the image data, the image data may be encoded based at least in part on a motion vector used to indicate desired value of the image data. Further, in other instances, intra-frame prediction techniques may be used to indicate image data (e.g., a prediction unit) corresponding with a first image frame by referencing image data (e.g., a reference sample) within the first image frame.

In some instances, image data may be captured for real-time or near real-time display and/or transmission. For example, when an image sensor (e.g., digital camera) captures image data, an electronic display may shortly thereafter display image frames based on the captured image data. Additionally or alternatively, an electronic device may shortly thereafter transmit the image frames to another electronic device and/or a network. As such, the ability to display and/or transmit in real-time or near real-time may be based at least in part on efficiency with which the image data is encoded, for example, using inter-frame or intra-frame prediction techniques. However, determining which prediction technique to use to encode image data may be computationally complex, for example, due to a number of clock cycles used to process distortion measurement calculations.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure generally relates to encoding source (e.g., uncompressed) image data, which may enable reducing transmission bandwidth and/or memory usage. To facilitate, a mode decision block of a video encoding pipeline may determine encoding operational parameters and implement the encoding operational parameters to encode the source image data. In some embodiments, the source image data may be encoded using prediction techniques (e.g., intra-frame prediction techniques or inter-frame prediction techniques) by referencing other image data. For example, intra-frame prediction techniques may facilitate encoding source image data by referencing image data used to display the same image frame. Additionally, inter-frame prediction techniques may facilitate encoding source image data by referencing image data used to display other image frames.

To select between inter-frame prediction modes or intra-frame prediction modes, the video encoding pipeline may provide a rate distortion calculation for the inter-frame prediction mode and the intra-frame prediction mode. The rate distortion calculation may enable the video encoding pipeline to determine which prediction mode is more adequately suited to encode the specific source image data. Additionally, the present disclosure provides techniques for selecting between a higher processing cost calculation and a lower processing cost calculation used to calculate the rate distortion calculation. For example, the higher-cost calculation or the lower-cost calculation may be selected based on resolution of the source image data, a frame rate of the source image data, a power mode of a device encoding the source image data, or any other operational parameter of the source image data or the device that may relate to efficiency of the encoding process.

Accordingly, the present disclosure provides techniques to improve operational efficiency of the video encoding pipeline. In some embodiments, operational efficiency may be improved by controlling whether a higher-cost or lower-cost calculation is used when selecting between an inter-frame prediction technique or an intra-frame prediction technique. The higher-cost or lower-cost calculation may be selected based on operational parameters of the source image data and operational parameters of a display pipeline encoding of the source image data.

BRIEF DESCRIPTION OF THE DRAWINGS

Various aspects of this disclosure may be better understood upon reading the following detailed description and upon reference to the drawings in which.

DETAILED DESCRIPTION

Figure 1:
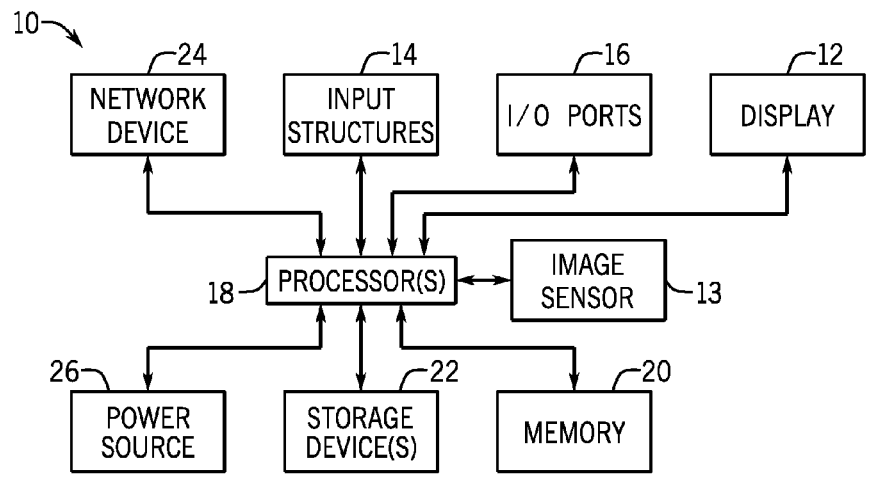
FIG. 1 is a block diagram of a electronic device, in accordance with an embodiment.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As mentioned above, an electronic device may facilitate visually presenting information by instructing an electronic display to display image frames based on image data. In some embodiments, the image data may be generated by an image sensor (e.g., digital camera) and stored in the electronic device. Additionally, when the image data is generated external from the electronic display, the image data may be transmitted to the electronic device. To reduce resource usage, image data may be encoded (e.g., compressed) to reduce size (e.g., number of bits) which, for example, may reduce transmission bandwidth and/or memory address usage.

In some embodiments, a video encoding pipeline may determine encoding operational parameters and implement the encoding operational parameters to encode source image data. To facilitate encoding, source image data for an image frame may be divided into one or more coding units. As used herein, a "coding unit" is intended to describe a sample of source image data (e.g., pixel image data) corresponding to a group of display pixels, which is encoded using the same prediction technique.

Accordingly, the video encoding pipeline may determine a prediction technique (e.g., intra-frame prediction techniques or inter-frame prediction techniques) to implement on a coding unit, thereby generating a prediction sample. Prediction techniques may facilitate encoding by enabling the source image data to be indicated via reference to other image data. For example, since an image frame may change gradually, the video encoding pipeline may utilize intra-frame prediction techniques to produce a prediction sample based on image data used to display the same image frame. Additionally, since successively displayed image frames may change gradually, the video encoding pipeline may utilize inter-frame prediction techniques to produce a prediction sample based on image data used to display other image frames.

Although conceptually similar, each prediction technique may include one or more prediction modes that utilize different encoding schemes. As such, different prediction modes may result in different prediction samples. For example, utilizing a first intra-frame prediction mode (e.g., vertical prediction mode), the video encoding pipeline may produce a prediction sample with each column set equal to image data for a pixel directly above the column. On the other hand, utilizing a second intra-frame prediction mode (e.g., DC prediction mode), the video encoding pipeline may produce a prediction sample set equal to an average of adjacent pixel image data. Additionally, utilizing a first inter-frame prediction mode (e.g., first reference index and first motion vector), the video encoding pipeline may produce a prediction sample based on a reference sample at a first position within a first image frame. On the other hand, utilizing a second inter-frame prediction mode (e.g., second reference index and second motion vector), the video encoding pipeline may produce a prediction sample based on a reference sample at a second position within a second image frame.

Although using the same prediction technique, a coding unit may be predicted using one or more different prediction modes. As using herein, a "prediction unit" is intended to describe a sample within a coding unit that utilizes the same prediction mode. In some embodiments, a coding unit may include a single prediction unit. In other embodiments, the coding unit may be divided into multiple prediction units, which each uses a different prediction mode.

Accordingly, the video encoding pipeline may evaluate candidate prediction modes (e.g., candidate inter-frame prediction modes and/or candidate intra-frame prediction modes) to determine what prediction mode to use for each prediction unit in a coding unit. To facilitate, a motion estimation (ME) block in the video encoding pipeline may determine one or more candidate inter-frame prediction modes. In some embodiments, an inter-frame prediction mode may include a reference index (e.g., temporal position), which indicates which image frame a reference sample is located, and a motion vector (e.g., spatial position), which indicates position of the reference sample relative to a prediction unit.

To determine a candidate inter-frame prediction mode, the motion estimation block may search image data (e.g., reconstructed samples) used to display other image frames for reference samples that are similar a prediction unit. Once a reference sample is determined, the motion estimation block may determine a motion vector and reference index to indicate location of the reference sample.

Generally, the quality of the match between prediction unit and reference sample may be dependent on search area (e.g., amount of image data). For example, increasing search area may improve likelihood of finding a closer match with the prediction unit. However, increasing search area may also increase computation complexity and, thus, searching duration. In some embodiments, a duration provided for the motion estimation block to perform its search may be limited, for example, to enable real-time or near real-time transmission and/or display.

Accordingly, as will be described in more detail below, the present disclosure provides techniques to improve operational efficiency of a video encoding pipeline and, particularly, a main pipeline that includes a motion estimation block. In some embodiments, operational efficiency may be improved by including a lower-cost calculation for selecting between the inter-frame and intra-frame prediction techniques. In this manner, the main pipeline may dynamically select between the lower-cost calculation and a higher-cost calculation for selecting between the inter-frame and intra-frame prediction techniques based on operation parameters of the electronic device and the image data.

To help illustrate, a computing device 10 that may include an electronic display 12 to display image frames based on image data and/or an image sensor 13 to capture image data is described in FIG. 1. As will be described in more detail below, the computing device 10 may be any suitable computing device, such as a handheld computing device, a tablet computing device, a notebook computer, and the like. Thus, it should be noted that FIG. 1 is merely one example of a particular implementation and is intended to illustrate the types of components that may be present in the computing device 10.

In the depicted embodiment, the computing device 10 includes the electronic display 12, the image sensor 13, input structures 14, input/output (I/O) ports 16, a processor core complex 18 having one or more processor(s) or processor cores, local memory 20, a main memory storage device 22, a network interface 24, and a power source 26. The various components described in FIG. 1 may include hardware elements (e.g., circuitry), software elements (e.g., a tangible, non-transitory computer-readable medium storing industrious), or a combination of both hardware and software elements. It should be noted that the various depicted components may be combined into fewer components or separated into additional components. For example, the local memory 20 and the main memory storage device 22 may be included in a single component.

As depicted, the processor complex 18 is operably coupled with local memory 20 and/or the main memory storage device 22. Thus, the processor complex 18 may execute instruction stored in local memory 20 and/or main memory storage device 22 to perform operations in the computing device 10, such as encoding image data captured by the image sensor 13 and/or decoding image data for display on the electronic display 12. As such, the processor complex 18 may include one or more general purpose microprocessors, one or more application specific processors (ASICs), one or more field programmable logic arrays (FPGAs), or any combination thereof.

Additionally, the local memory 20 and the main memory storage device 22 may be tangible, non-transitory, computer-readable mediums that store instructions executable by and data to be processed by the processor complex 18. For example, the local memory 20 may include random access memory (RAM) and the main memory storage device 22 may include read only memory (ROM), rewritable nonvolatile memory such as flash memory, hard drives, optical discs, and the like. By way of example, a computer program product containing the instructions may include an operating system or an application program.

Additionally, as depicted, the processor complex 18 is operably coupled with the network interface 24. Thus, the computing device may be communicatively coupled to a network and/or other computing devices. For example, the network interface 24 may connect the computing device 10 to a personal area network (PAN), such as a Bluetooth network, a local area network (LAN), such as an 802.11x Wi-Fi network, and/or a wide area network (WAN), such as a 4G or LTE cellular network. Thus, in some embodiments, the network interface 24 may enable the computing device 10 to transmit encoded image data to a network and/or receive encoded image data from the network for display on the electronic display 12.

In addition to the network interface 24, the processor complex 18 is operably coupled with I/O ports 16, which may enable the computing device 10 to interface with various other electronic devices. For example, a portable storage device may be connected to an I/O port 16, thereby enabling the processor complex 18 to retrieve data stored in the portable storage device. Thus, in some embodiments, the I/O ports 16 may enable the computing device 10 to output encoded image data and/or receive encoded image data from other electronic devices.

As depicted, the processor complex 18 is also operably coupled to the power source 26, which may provide power to the various components in the computing device 10. As such, the power source 26 may include any suitable source of energy, such as a rechargeable lithium polymer (Li-poly) battery and/or an alternating current (AC) power converter. Furthermore, as depicted, the processor complex 18 is operably coupled with input structures 14, which may enable a user to interact with the computing device 10. Accordingly, the inputs structures 14 may include buttons, keyboards, mice, trackpads, and the like. Additionally, in some embodiments, the electronic display 12 may include touch components that facilitate user inputs by detecting occurrence and/or position of an object touching its screen (e.g., surface of the electronic display 12).

In addition to enabling user inputs, the electronic display 12 may present visual representations of information by display image frames, such as a graphical user interface (GUI) of an operating system, an application interface, a still image, or video content. As described above, the electronic display 12 may display the image frames based on image data. In some embodiments, the image data may be received from other computing devices 10, for example, via the network interface 24 and/or the I/O ports 16. Additionally or alternatively, the image data may be generated by the image sensor 13. More specifically, image sensor 13 may digitally captures visual representations of physical features proximate the image sensor as image data.

As described above, the image data may be encoded (e.g., compressed), for example, by the computing device 10 that generated the image data to reduce number of memory addresses used to store and/or bandwidth used to transmit the image data. Once generated or received, the encoded image data may be stored in local memory 20. Accordingly, to display image frames, the processor complex 18 may retrieve encoded image data from local memory 20, decode the encoded image data, and instruct the electronic display 12 to display image frames based on the decoded image data.

Figure 2:
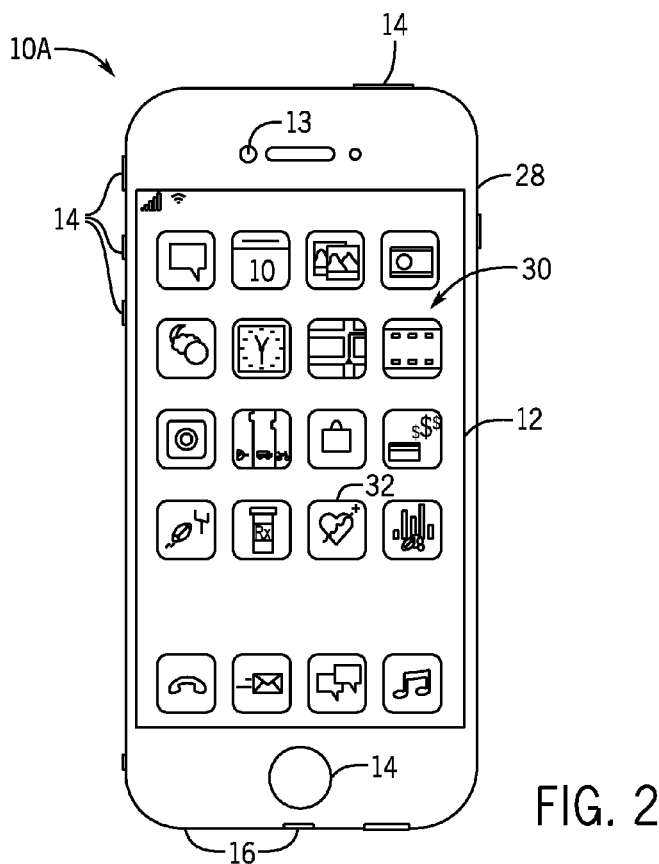
FIG. 2 is an example of the electronic device of FIG. 1, in accordance with an embodiment.

As described above, the computing device 10 may be any suitable electronic device. To help illustrate, one example of a handheld device 10A is described in FIG. 2, which may be a portable phone, a media player, a personal data organizer, a handheld game platform, or any combination of such devices. For example, the handheld device 10A may be a smart phone, such as any iPhone® model available from Apple Inc. As depicted, the handheld device 10A includes an enclosure 28, which may protect interior components from physical damage and to shield them from electromagnetic interference. The enclosure 28 may surround the electronic display 12, which, in the depicted embodiment, displays a graphical user interface (GUI) 30 having an array of icons 32. By way of example, when an icon 32 is selected either by an input structure 14 or a touch component of the electronic display 12, an application program may launch.

Additionally, as depicted, input structures 14 open through the enclosure 28. As described above, the input structures 14 may enable a user to interact with the handheld device 10A. For example, the input structures 14 may activate or deactivate the handheld device 10A, navigate a user interface to a home screen, navigate a user interface to a user-configurable application screen, activate a voice-recognition feature, provide volume control, and toggle between vibrate and ring modes. As depicted, I/O ports 16 also open through the enclosure 28. In some embodiments, the I/O ports 16 may include, for example, an audio jack to connect to external devices. Furthermore, as depicted, the image sensor 13 opens through the enclosure 28. In some embodiments, the image sensor 13 may include, for example, a digital camera to capture image data.

Figure 3:
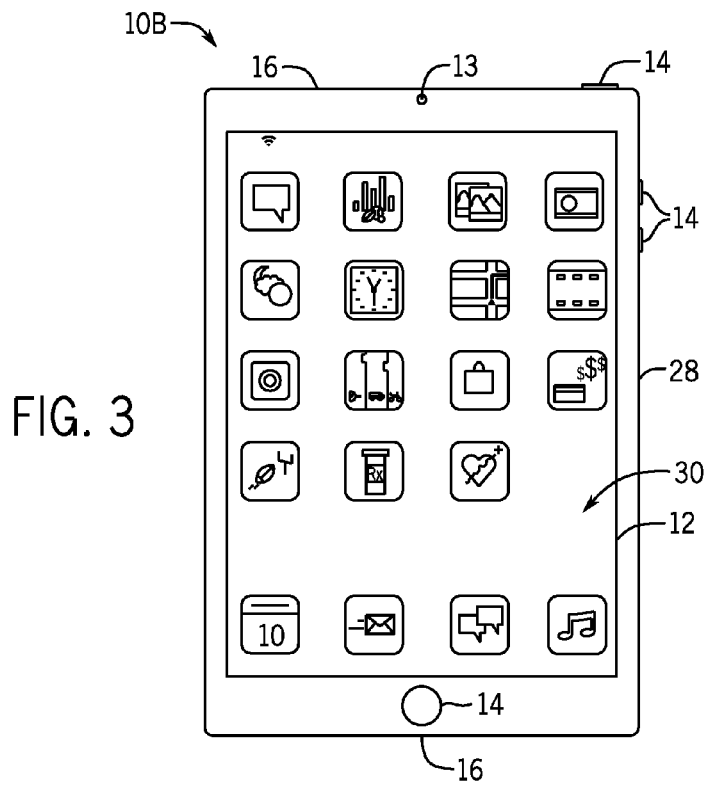
FIG. 3 is an example of the electronic device of FIG. 1, in accordance with an embodiment.
Figure 4:
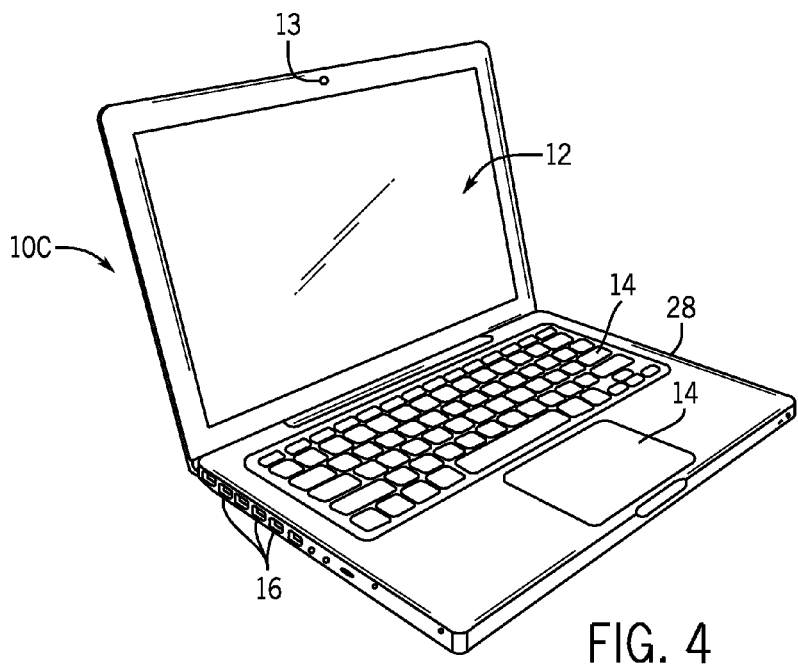
FIG. 4 is an example of the electronic device of FIG. 1, in accordance with an embodiment.
Figure 5:
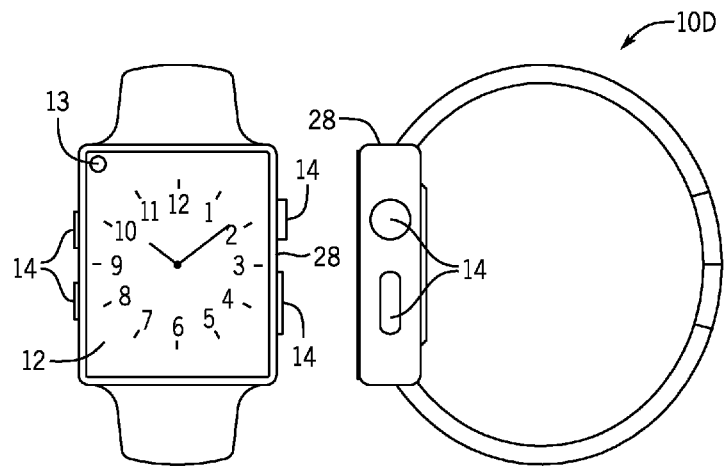
FIG. 5 is an example of the electronic device of FIG. 1, in accordance with an embodiment.

To further illustrate a suitable computing device 10, a tablet device 10B is described in FIG. 3, such as any iPad® model available from Apple Inc. Additionally, in other embodiments, the computing device 10 may take the form of a computer 10C as described in FIG. 4, such as any Macbook® or iMac® model available from Apple Inc. Furthermore, in other embodiments, the computing device 10 may take the form of a watch 10D as described in FIG. 5, such as an Apple Watch® model available from Apple Inc. As depicted, the tablet device 10B, the computer 10C, and the watch 10D may each also include an electronic display 12, an image sensor 13, input structures 14, I/O ports 16, an enclosure 28, or any combination thereof.

As described above, image data may be encoded (e.g., compressed) to reduce resource usage. Additionally, in some embodiments, the duration between generation of image data and display of image frames based on the image data may be short to enable real-time or near real-time display of captured image frames. For example, image data captured by the image sensor 13 may be displayed on the electronic display 12 with minimal delay to enable a user to determine physical features proximate the image sensor 13 in real-time or near real-time. Additionally, image data captured by the image sensor 13 may be transmitted (e.g., broadcast) to one or more other computing devices 10 to enable a real-time or near real-time stream of physical features proximate the image sensor 13.

Accordingly, to enable real-time or near real-time transmission and/or display, duration available to encode the image data may be limited. Thus, particularly as resolution of image frames and refresh rates of electronic displays 12 increase, it would be beneficial to improve operational efficiency of a video encoding pipeline used to encode image data.

Figure 6:
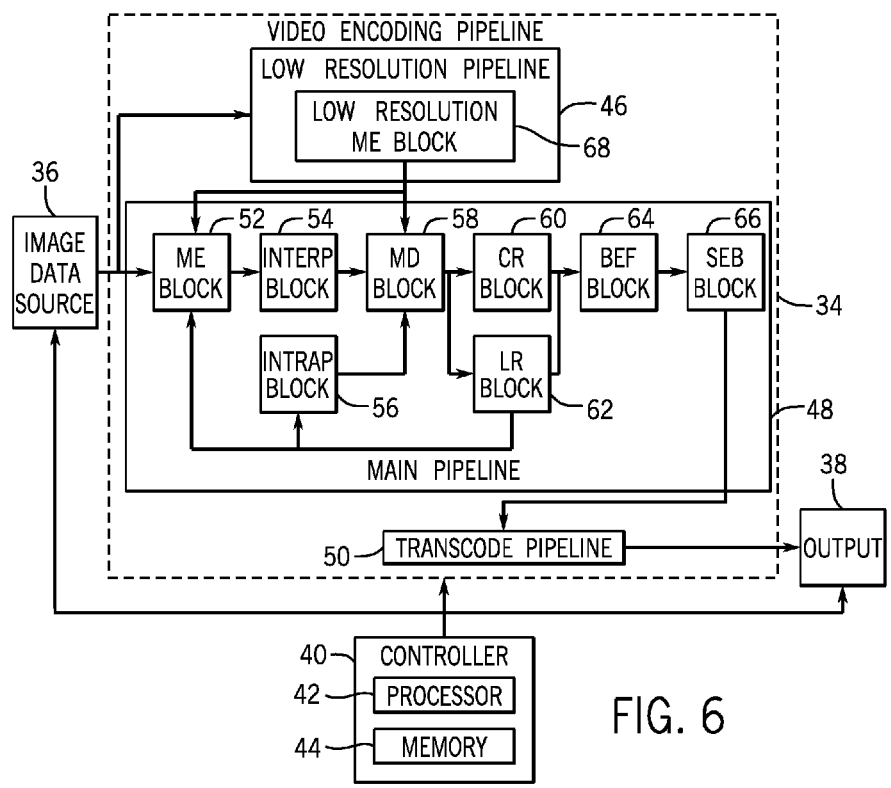
FIG. 6 is block diagram of a video encoding pipeline used to encode image data, in accordance with an embodiment.

One embodiment of a video encoding pipeline 34 is described in FIG. 6. As depicted, the video encoding pipeline 34 is communicatively coupled to an image data source 36, an output 38, and a controller 40. In the depicted embodiment, the controller 40 may generally control operation of image data source 36, the video encoding pipeline 34, and the output 38. Although depicted as a single controller 40, in other embodiments, separate controllers 40 may be used to control operation of any combination of the image data source 36, the video encoding pipeline 34, and the output 38.

To facilitate controlling operation of the video encoding pipeline 34, the controller 40 may include a controller processor 42 and controller memory 44. In some embodiments, the controller processor 42 may execute instructions and/or process data stored in the controller memory 44 to control operation of the image data source 36, the video encoding pipeline 34, and/or the output 38. In other embodiments, the controller processor 42 may be hardwired to control operation in the image data source 36, the video encoding pipeline 34, and/or the output 38. Additionally, in some embodiments, the controller processor 42 may be included in the processor complex 18 and/or separate processing circuitry (e.g., in the electronic display), and the controller memory 44 may be included in local memory 20, main memory storage device 22, and/or a separate, tangible, non-transitory computer-readable medium (e.g., in the electronic display).

As depicted, the video encoding pipeline 34 is communicatively coupled to the image data source 36. Accordingly, the video encoding pipeline 34 may receive source (e.g., uncompressed) image data from the image data source 36. Thus, in some embodiments, the image data source 36 may be an image sensor 13 and/or any other suitable device that generates source image data.

Additionally, as depicted, the video encoding pipeline 34 is communicatively coupled to the output 38. Accordingly, the video encoding pipeline 34 may output encoded (e.g., compressed) image data to the output 38, for example, for storage and/or transmission. Thus, in some embodiments, the output 38 may include local memory 20, the storage device 22, the network interface 24, I/O ports 16, or any combination of these. Additionally, the output 38 may also include a display back-end to process the encoded image data to be displayed on an electronic display 12.

To facilitate generating encoded image data, the video encoding pipeline 34 may include multiple parallel pipelines. For example, in the depicted embodiment, the video encoding pipeline 34 includes a low resolution pipeline 46, a main pipeline 48, and a transcode pipeline 50. As will be described in more detail below, the main pipeline 48 may encode source image data using prediction techniques (e.g., inter-frame prediction techniques or intra-frame prediction techniques) and the transcode pipeline 50 may subsequently entropy encode syntax elements (e.g., quantization coefficient, inter-frame prediction mode, and/or intra-frame prediction mode) that enable decoding encoded image data.

To facilitate prediction encoding source image data, the main pipeline 48 may perform various functions. To simplify discussion, the functions are divided between various blocks in the main pipeline 48. For example, in the depicted embodiment, the main pipeline 48 includes a motion estimation (ME) block 52, an inter-frame prediction (InterP) block 54, an intra-frame prediction (IntraP) block 56, a mode decision (MD) block 58, chroma reconstruction (CR) block 60, a luma reconstruction (LR) block 62, a back-end-filter (BEF) block 64, and a syntax element binarization (SEB) block 66. Additionally, the luma reconstruction block 62 may also be embodied as a portion of the mode decision block 58. As used herein, a block may be defined as circuitry (e.g., ASIC or computer hardware), software (e.g., firmware or operating systems), or some combination of these.

As depicted, the motion estimation block 52 is communicatively coupled to the image data source 36. Thus, the motion estimation block 52 may receive source image data from the image data source 36, which may include a luma component (e.g., Y) and two chroma components (e.g., Cr and Cb). In some embodiments, the motion estimation block 52 may process one coding unit, including one luma coding block and two chroma coding blocks, at a time. As used herein a "luma coding block" is intended to describe the luma component of a coding unit and a "chroma coding block" is intended to describe one of the chroma components of a coding unit. In some embodiments, the luma coding block may be the same resolution as the coding unit. On the other hand, the chroma coding blocks may vary in resolution based on chroma sampling format. For example, using a 4:4:4 sampling format, the chroma coding blocks may be the same resolution as the coding unit. However, the chroma coding blocks may be half the resolution in a horizontal direction of the coding unit when a 4:2:2 sampling format is used and half the resolution in both the horizontal direction and a vertical during of the coding unit when a 4:2:0 sampling format is used.

As described above, a coding unit may include one or more prediction units, which may each be encoded using a different prediction technique. Thus, each prediction unit may include one luma prediction block and two chroma prediction blocks. As used herein a "luma prediction block" is intended to describe the luma component of a prediction unit and a "chroma prediction block" is intended to describe one of the chroma components of a prediction unit. In some embodiments, the luma prediction block may be the same resolution as the prediction unit. On the other hand, similar to the chroma coding blocks, the chroma prediction blocks may vary in resolution based on chroma sampling format.

Based at least in part on the one or more luma prediction blocks, the motion estimation block 52 may determine candidate inter-frame prediction modes that can be used to encode a prediction unit. As described above, an inter-frame prediction mode may include a motion vector and a reference index to indicate location of a reference sample relative to a prediction unit.

To determine a candidate inter-frame prediction mode for a prediction unit, the motion estimation block 52 may search reconstructed luma image data received from the luma reconstruction block 62. More specifically, the motion estimation block 52 may determine a reference sample for the prediction unit by comparing its luma prediction block to the reconstructed luma image data. In some embodiments, the motion estimation block 52 may determine how closely the luma prediction block and a luma reference sample match based on a match metric. In some embodiments, the match metric may be the sum of absolute difference (SAD) between the luma prediction block and the luma reference sample. Additionally or alternatively, the match metric may be the sum of absolute transformed difference (SATD) between the luma prediction block and the luma reference sample. Thus, when the match metric is above a threshold, the motion estimation block 52 may determine that a reference sample and the prediction unit do not closely match. On the other hand, when the match metric is below the threshold, the motion estimation block 52 may determine that the reference sample and the prediction unit closely match.

After a reference sample that sufficiently matches the prediction unit is determined, the motion estimation block 52 may determine location of the reference sample relative to the prediction unit. For example, the motion estimation block 52 may determine the reference index to indicate image frame containing the reference sample relative to the image frame containing the prediction unit. Additionally, the motion estimation block 52 may determine the motion vector to indicate position of the reference sample relative to the prediction unit. In some embodiments, the motion vector may be expressed as (mvX, mvY), where mvX is horizontal offset and mvY is a vertical offset between the prediction unit and the reference sample.

In this manner, the motion estimation block 52 may determine candidate inter-frame prediction modes for one or more prediction units in the coding unit. The motion estimation block 52 may then input candidate inter-frame prediction modes to the inter-frame prediction block 54. Based at least in part on the candidate inter-frame prediction modes, the inter-frame prediction block 54 may determine luma prediction samples.

In some embodiments, the inter-frame prediction block 54 may determine a luma prediction sample by applying motion compensation to a luma reference sample indicated by a candidate inter-frame prediction mode. For example, the inter-frame prediction block 54 may apply motion compensation by determining value of the luma reference sample at fractional (e.g., quarter or half) sample position. The inter-frame prediction block 54 may then input the luma prediction sample and the candidate inter-frame prediction mode to the mode decision block 58 for consideration. In some embodiments, the inter-frame prediction block 54 may sort the candidate inter-frame prediction modes based on associated mode cost and input only a specific number to the mode decision block 58.

The mode decision block 58 may also consider one or more candidate intra-frame predictions modes and corresponding luma prediction samples output by the intra-frame prediction block 56. As described above, the main pipeline 48 may be capable of using multiple (e.g., 17 in Advanced Video Coding (AVC) or 35 in HEVC) different intra-frame prediction modes to generate luma prediction samples based on adjacent pixel image data. Thus, in some embodiments, the intra-frame prediction block 56 may determine a candidate intra-frame prediction mode and a corresponding luma prediction sample for a prediction unit based at least in part on reconstructed luma image data for adjacent (e.g., top, top right, left, or bottom left) pixels received from the luma reconstruction block 62.

For example, utilizing a vertical prediction mode, the intra-frame prediction block 56 may set each column of a luma prediction sample equal to reconstructed luma of a pixel directly above the column. Additionally, utilizing a DC prediction mode, the intra-frame prediction block 45 may set a luma prediction sample equal to an average of reconstructed luma of pixels adjacent the prediction sample. The intra-frame prediction block 56 may then input candidate intra-frame prediction modes and corresponding luma prediction samples to the mode decision block 58 for consideration. In some embodiments, the intra-frame prediction block 56 may sort the candidate intra-frame prediction modes based on associated mode cost and input only a specific number to the mode decision block 58.

Based at least in part on any received candidate prediction modes, the mode decision block 58 may determine operational parameters used to encode the coding block. In some embodiments, the encoding operational parameters may include prediction (e.g., intra-prediction or inter-prediction) technique, number of prediction units, size of prediction units, prediction (e.g., intra-prediction or inter-prediction) mode of each prediction unit, number of transform units, size of transform units, whether to split the coding unit into smaller coding units, or any combination thereof.

To facilitate determining the encoding operational parameters, the mode decision block 58 may determine whether the image frame is an I-frame, a P-frame, or a B-frame. In I-frames, source image data is encoded only by referencing other image data used to display the same image frame. Accordingly, when the image frame is an I-frame, the mode decision block 58 may determine that an intra-frame prediction technique should be used for each coding unit in the image frame.

On the other hand, in a P-frame or B-frame, source image data may be encoded by referencing image data used to display the same image frame and/or a different image frames. More specifically, in a P-frame, source image data may be encoding by referencing image data used to display a previous image frame. Additionally, in a B-frame, source image data may be encoded by referencing both image data used to display a previous image frame and image data used to display a subsequently image frame. Accordingly, when the image frame is a P-frame or a B-frame, the mode decision block 58 may determine whether to encode a coding unit using either intra-frame techniques or inter-frame techniques for each coding unit in the image frame.

Although using the same prediction technique, the configuration of luma prediction blocks in a coding unit may vary. For example, the coding unit may include a variable number of luma prediction blocks at variable locations within the coding unit, which each uses a different prediction mode. As used herein, a "prediction mode configuration" is intended to describe number, size, location, and prediction mode of luma prediction blocks in a coding unit. Thus, the mode decision block 58 may determine one or more candidate inter-frame prediction mode configurations using one or more of the candidate inter-frame prediction modes received from the inter-frame prediction block 54. Additionally, the mode decision block 58 may determine one or more candidate intra-frame prediction mode configurations using one or more of the candidate intra-frame prediction modes received from the intra-frame prediction block 56.

Since a coding block may utilize the same prediction technique, the mode decision block 58 may determine prediction technique for a coding unit by comparing rate-distortion cost associated with the candidate prediction mode configurations. In some embodiments, the rate-distortion cost may be as follows:

$$RD = A(\text{rate\_cost}) + B(\text{distortion\_cost}) \quad (1)$$

where RD is the rate-distortion cost associated with a prediction mode configuration, rate_cost is rate expected to be used to indicate the source image data, distortion_cost is a distortion metric (e.g., sum of squared difference), A is a weighting factor for the rate, and B is a weighting factor for the distortion metric.

The distortion metric may indicate amount of distortion in decoded image data, which may be displayed on an electronic display 12, expected to be caused by implementing a prediction mode configuration. Accordingly, in some embodiments, the distortion metric may be a sum of squared difference (SSD) or a sum of absolute transformed differences (SATD) between a luma coding unit (e.g., source image data) and reconstructed luma image data received from the luma reconstruction block 62. As will be described in more detail below, reconstructed image data may be generated by determining a prediction residual by subtracting a prediction sample from source image data, performing a forward transform and quantization (FTQ) on the residual, performing an inverse transform and quantization (ITQ), and adding the reconstructed residual to the prediction sample.

In some embodiments, the prediction residual may be transformed as one or more transform units. As used herein, a "transform unit" is intended to describe a sample within a coding unit that is transformed together. In some embodiments, a coding unit may include a single transform unit. In other embodiments, the coding unit may be divided into multiple transform units, which is each separately transformed.

Additionally, the rate estimate for an intra-frame prediction mode configuration may include number of bits used to indicate intra-frame prediction technique (e.g., coding unit overhead), number of bits used to indicate intra-frame prediction mode, number of bits used to indicate a residual (e.g., source image data—prediction sample), and number of bits used to indicate a transform unit split. On the other hand, the rate estimate for an inter-frame prediction mode configuration may include number of bits used to indicate inter-frame prediction technique, number of bits used to indicate a motion vector (e.g., motion vector difference), and number of bits used to indicate a transform unit split.

In embodiments where the rate-distortion cost of equation (1) is used, the mode decision block 58 may select prediction mode configuration with the lowest associated rate-distortion cost for a coding unit. In this manner, the mode decision block 58 may determine encoding operation parameters including prediction technique used for the coding unit, prediction unit configuration (e.g., size, number, location, and prediction mode), transform unit configuration (e.g., size, number, location, and prediction mode), and/or whether to split the coding unit into smaller coding units.

The main pipeline 48 may then mirror decoding of encoded image data, which may facilitate improving quality of the decoded image data and/or operational efficiency of the main pipeline 48. To facilitate, the mode decision block 58 may output the encoding operational parameters and/or luma prediction samples to the chroma reconstruction block 60 and the luma reconstruction block 62.

Based on the encoding operational parameters, the luma reconstruction block 62 may generate reconstructed luma image data. In some embodiments, luma reconstruction block 62 may then divide the luma coding block into luma transform blocks as determined by the mode decision block 58, perform a forward transform and quantization on each of the luma transform blocks, and perform an inverse transform and quantization on each of the luma transform blocks to determine a reconstructed luma prediction residual. The luma reconstruction block 62 then adds the reconstructed luma prediction residual to a luma prediction sample, which may be received from the mode decision block 58 or recomputed, to determine reconstructed luma image data. As described above, the reconstructed luma image data may then be fed back to other blocks in the main pipeline 48. Additionally, the reconstructed luma image data may be input to the back-end-filter 64 block.

Similarly, the chroma reconstruction block 60 may generate reconstructed chroma image data for each chroma component based at least in part on the encoding operational parameters. For example, when luma and chroma are sampled at the same resolution (e.g., 4:4:4 sampling format), the chroma reconstruction block 60 may utilize the same encoding operational parameters as the luma reconstruction block 62. In such embodiments, for each chroma component, the chroma reconstruction block 60 may retrieve reconstructed chroma image data and determine a chroma prediction sample by applying the prediction mode determined by the mode decision block 58 to the reconstructed chroma image data. By subtracting the chroma prediction sample from a chroma coding block (e.g., source image data), the chroma reconstruction block 60 may determine a chroma prediction residual.

Additionally, the chroma reconstruction block 60 may divide the chroma coding block into chroma transform blocks as determined by the mode decision block 58, perform a forward transform and quantization on each of the chroma transform blocks, and perform an inverse transform and quantization on each of the chroma transform blocks to determine a reconstructed chroma prediction residual. The chroma reconstruction block may then add the reconstructed chroma prediction residual to the chroma prediction sample to determine reconstructed chroma image data, what may be input to the back-end-filter block.

However, in other embodiments, chroma sampling resolution may vary from luma sampling resolution, for example when a 4:2:2 or 4:2:0 sampling format is used. In such embodiments, encoding operational parameters determined by the mode decision block 58 may be scaled. For example, when the 4:2:2 sampling format is used, size of chroma prediction blocks may be scaled in horizontally half from the size of prediction units determined in the mode decision block 58. Additionally, when the 4:2:0 sampling format is used, size of chroma prediction blocks may be scaled vertically and horizontally in half from the size of prediction units determined in the mode decision block 58. In a similar manner, a motion vector determined by the mode decision block 58 may be scaled for use with chroma prediction blocks.

The back-end-filter block 64 may then filter improve quality of reconstructed image data (e.g., reconstructed chroma image data and/or reconstructed luma image data). In some embodiments, the back-end-filter block 64 may perform deblocking and/or sample adaptive offset (SAO) functions. For example, the back-end-filter 64 may perform deblocking on the reconstructed image data to reduce perceivability of blocking artifacts that may be introduced. Additionally, the back-end-filter 64 may perform a sample adapt offset function by adding offsets to portions of the reconstructed image data.

To enable decoding of encoded image data, encoding operational parameters may be communicated to a decoding device. In some embodiments, the encoding operational parameters may include the encoding operational parameters determined by the mode decision block 58 (e.g., prediction unit configuration and/or transform unit configuration) as well as encoding operational parameters used by the back-end-filter block 64. To facilitate, the encoding operational parameters may be communicated as syntax elements. For example, a first syntax element may indicate a prediction mode (e.g., inter-frame prediction mode or intra-frame prediction mode), a second syntax element may indicate a quantization coefficient, a third syntax element may indicate configuration of prediction units, and a fourth syntax element may indicate configuration of transform units.

In some embodiments, resources used to communicate the encoding operational parameters may be reduced using entropy encoding, such as context adaptive binary arithmetic coding (CABAC) and/or context-adaptive variable-length coding (CAVLC). To facilitate, the syntax element binarization block 66 may receive encoding operational parameters from the mode decision block 58 and/or the back-end-filter block 64 and binarize the syntax elements used to indicate the encoding operational parameters. More specifically, the syntax element binarization block 66 may map a syntax element to corresponding a binary symbol, which includes one or more bins (e.g., "0" or "1"), for example, using exp-golomb, fixed length, truncated unary, or truncated rice. In this manner, the syntax element binarization block 66 may generate a bin stream, which is supplied to the transcode pipeline 50.

The transcode pipeline 50 may then convert the bin stream to a bit stream with one or more syntax elements represented by a fractional number of bits, thereby improving encoding efficiency (e.g., size of encoded image data). In some embodiments, the transcode pipeline 50 may compress bins from the bin stream into bits using arithmetic coding. To facilitate arithmetic coding, the transcode pipeline 50 may determine a context model for a bin, which indicates probability of the bin being a "1" or "0," based on previous bins. Based on the probability of the bin, the transcode pipeline 50 may divide a range into two sub-ranges. The transcode pipeline 50 may then determine an encoded bit such that it falls within one of two sub-ranges to select the actual value of the bin. In this manner, multiple bins may be represented by a single bit, thereby improving encoding efficiency (e.g., reduction in size of source image data). After entropy encoding, the transcode pipeline 50, may transmit the encoded image data to the output 38 for transmission, storage, and/or display.

As described above, the duration provided for encoding image data may be limited, particularly to enable real-time or near real-time display and/or transmission. To improve operational efficiency (e.g., operating duration and/or power consumption) of the main pipeline 48, the low resolution pipeline 46 may include a low resolution motion estimation (ME) block 68. As will be described in more detail below, the lower resolution motion estimation block 68 may improve operational efficiency by initializing the motion estimation block 52 with candidate inter-frame prediction modes, which may facilitate reduction searching performed by the motion estimation block 52. Additionally, the low resolution motion estimation block 68 may improve operational efficiency by indicating scene changes to the mode decision block 58 and/or the motion estimation block 52, which may enable only considering intra-frame prediction modes and, thus, disabling the motion estimation block 52.

Figure 7:
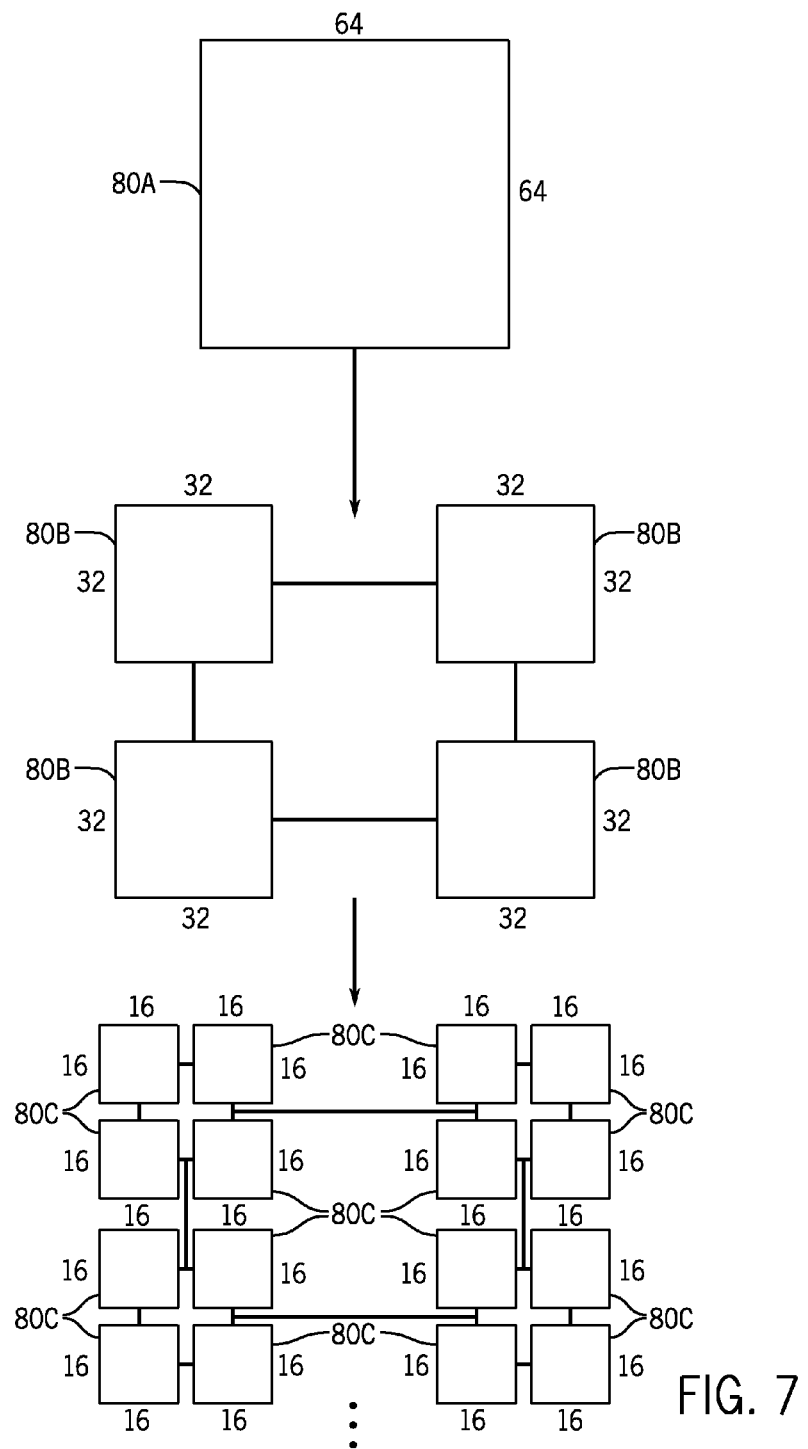
FIG. 7 is a diagrammatic representation of a subdivision of prediction units into multiple sizes, in accordance with an embodiment.

When encoding the image data, an image may be subdivided into prediction units, as depicted in FIG. 7. For example, prediction units may be a prediction block 80A of 64×64 pixels, a prediction block 80B of 32×32 pixels, a prediction block 80C of 16×16 pixels, or the prediction units may be divided to even smaller prediction blocks (e.g., prediction blocks of 8×8 or 4×4 pixels). Using a high efficiency video coding (HEVC) standard, a cycle budget to complete encoding of one of the prediction blocks 80 is a performance cost to achieve real-time encoding of an image. For example, for an ASIC or DSP based real-time video encoder, the real-time performance cost translates to a number of clock cycles used to complete encoding a single prediction block 80. Accordingly, when a larger prediction block 80 is available for encoding, a smaller number of the prediction blocks are 80 are manipulated to produce compressed image data for an entire image frame. In this manner, the larger prediction blocks 80 (e.g., the prediction block 80C or greater) enable an increase in efficiency while the image data is encoded due to a smaller number of the prediction blocks 80 that are processed while encoding the image data. Further, as discussed herein, real-time encoding of an image may be defined as completion of encoding one picture of a video sequence within a recording or display time of a picture. For example, real-time encoding of an image may mean that the video encoder processes video data at a rate sufficiently fast to match or exceed a video frame rate.

Figure 8:
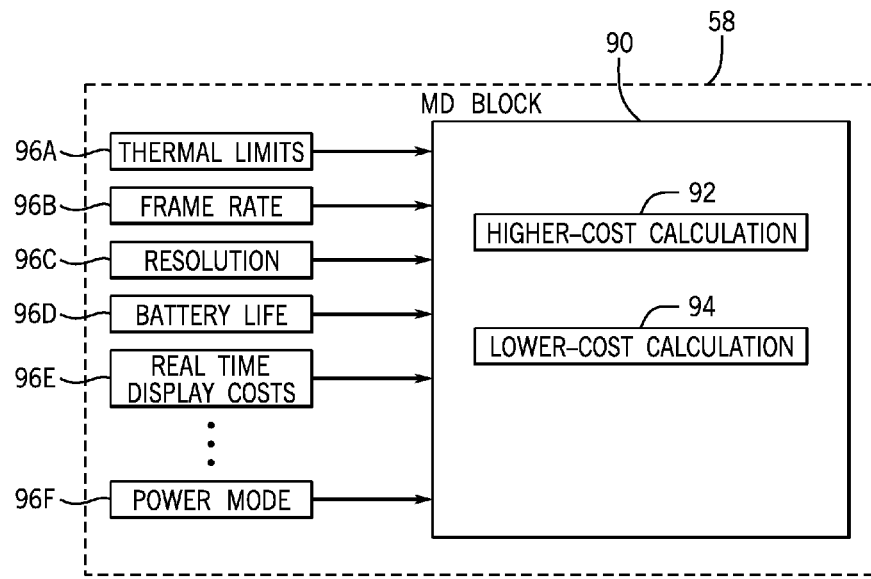
FIG. 8 is a block diagram of a distortion measurement block, in accordance with an embodiment.

With the foregoing in mind, FIG. 8 is a block diagram of the mode decision block 58. As discussed above, the mode decision block 58 may determine parameters used to encode the prediction block 80. In some embodiments, the encoding parameters may include prediction (e.g., intra-frame prediction or inter-frame prediction) technique, number of prediction units, size of prediction units, prediction (e.g., intra-frame prediction or inter-frame prediction) mode of each prediction unit, number of transform units, size of transform units, whether to split the coding unit into smaller coding units, or any combination thereof. In particular, a distortion measurement block 90 may determine whether a higher-cost calculation 92 or a lower-cost calculation 94 is used to generate a distortion measurement. Generally speaking, the distortion measurement may be a measurement that determines whether the intra-frame or inter-frame prediction mode is used when encoding the image data.

In selecting the higher-cost calculation 92 for determining the distortion measurement, the distortion measurement block 90 may determine that the real-time performance cost will not be overly demanding on the video encoding pipeline 34. This determination may be performed based on operational parameters 96 received by the distortion measurement block 90. The operational parameters 96 may include thermal limits 96A of the video encoding pipeline 34, a frame rate 96B of the image data, resolution 96C of the image data, battery life 96D of the electronic display 12, real-time display costs 96E of the electronic display 12, power mode 96F of the electronic display 12, and any other operational parameters 96 that may influence power consumption and real-time encoding efficiency of the electronic display 12. For example, as the operational parameters 96 provided to the distortion measurement block 90 result in decreased power consumption and/or decreased real-time efficiency, the higher-cost calculation 92 may be selected by the distortion measurement block 90. In contrast, as the operational parameters 96 provided to the distortion measurement block 90 result in increased power consumption and/or increased real-time efficiency, the lower-cost calculation 92 may be selected by the distortion measurement block 90.

If the distortion measurement block 90 selects the higher-cost calculation 92, a sum of squared differences (SSD) between an expected reconstructed pixel output from the encoder and an original pixel input to the encoder may be measured for the prediction blocks 80. The SSD may provide an accurate measurement for fidelity of encoded images as compared to fidelity of uncompressed images. The change in fidelity may be a result of a loss of fidelity that occurs for most video compression standards that are not lossless. When a timing demand for real-time performance of the encoding process is minimal, the SSD distortion measurement may provide heightened accuracy for determining whether an inter-frame or intra-frame prediction mode will provide a greatest fidelity at a lowest bit cost for image data encoding.

However, the SSD distortion measurement includes several functions in sequence to determine the expected reconstructed pixel output used in the SSD distortion measurement. These functions may include prediction, transform, quantization, inverse quantization, and inverse transform. Due to a high volume of functions, several clock cycles may be used when completing the SSD distortion measurement. By way of example, a 4K-resolution video with a frame rate of 60 frames per second (i.e., 4Kp60) may assign a smaller budget of clock cycles to perform the distortion measurement than the SSD distortion measurement may use to perform the SSD measurement. Under such a circumstance, the distortion measurement block 90 may select the lower-cost calculation 94 to perform the distortion measurement.

The lower-cost calculation 94 may include a sum of absolute transformed differences (SATD) as the distortion measurement. The SATD includes a frequency transform (e.g., a Hadamard transform) of differences between predicted pixels and the original pixels prior to a summation of absolute values for the prediction blocks 80. In general, the SATD distortion measurement may not be as accurate as the SSD distortion measurement because the SATD distortion measurement relies on predicted pixels while the SSD distortion measurement relies on reconstructed pixels. However, although the SATD distortion measurement generally provides a less accurate distortion measurement than the SSD distortion measurement described above, the SATD distortion measurement is generally accomplished using a smaller time budget than the SSD distortion measurement. Accordingly, the SATD distortion measurement (i.e., the lower-cost calculation 94) may be preferable when real-time performance is more demanding than, for example, a 4K-resolution video with a frame rate of 30 frames per second (i.e., 4Kp30). In selecting between the SSD distortion measurement and the SATD distortion measurement, the distortion measurement block 90 may achieve different levels of real-time performance by adapting the mode decision block 58 to real-time values of the operational parameters 96 without adding extra hardware or increasing clock rates and power consumption. Further, it may be appreciated that while the higher-cost calculation 92 and the lower-cost calculation 94 are described as the SSD distortion measurement and the SATD distortion measurement, respectively, other higher-cost calculations 92 and lower-cost calculations 94 may also be used.

Additionally, the distortion measurement block 90 may prioritize the operational parameters 96 received at the distortion measurement block 90. For example, when applying the distortion measurement block 90 to a mobile electronic device such as the handheld device 10A, the tablet device 10B, the computer 10C, or the watch 10D, the battery life 96D may take priority over several of the other operational parameters 96. Accordingly, if the higher-cost calculation 92 would use an increased clock rate to compensate for a more demanding real-time performance, the lower-cost calculation 94 may be selected by the distortion measurement block 90 to be used by the mode decision block 58. Conversely, if the computer 10C is receiving power from a wall outlet, then the battery life 96D would no longer be prioritized over other operational parameters 96. Accordingly, the distortion measurement block 90 may determine an increased clock rate to compensate for cycle costs associated with the higher-cost calculation 92 may be desirable to maintain real-time or near real-time performance. In this manner, the distortion measurement block 90 may not only alter which of the higher-cost calculation 92 or the lower-cost calculation 94 is used by the mode decision block 58 to select between the inter-frame or intra-frame prediction modes, but it may also dynamically alter the priority of the operational parameters 96 used by the distortion measurement block 90 in selecting the higher-cost calculation 92 or the lower-cost calculation 94.

Figure 9:
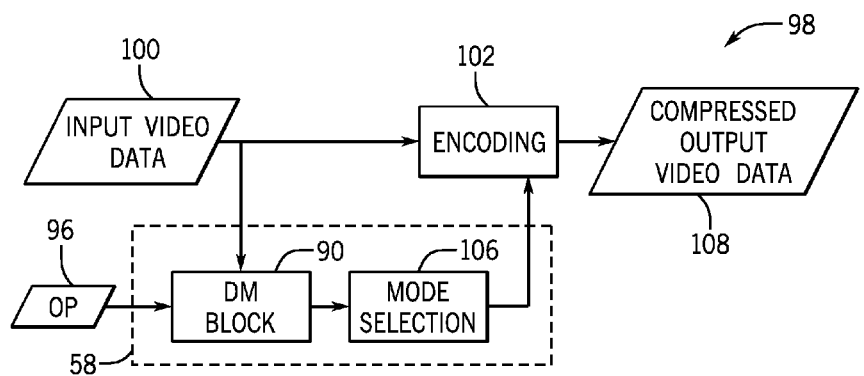
FIG. 9 is a flow diagram of an encoding process of input video data, in accordance with an embodiment.

To help illustrate a mode decision process, a flow diagram 98 representing an encoding process of input video data 100 is illustrated in FIG. 9. Initially, the input video data 100 is provided to an encoding block 102 and the mode decision block 58. As the video data 100 is supplied to the mode decision block 58, the distortion measurement block 90 receives the video data 100. As discussed above in the discussion of FIG. 8, the distortion measurement block 90 determines whether to use the higher-cost calculation 92 or the lower-cost calculation 94 in calculating the distortion measurement. Additionally, the distortion measurement block 90 may determine the resolution and frame rate of the video data 100 to assist in the determination of which distortion measurement calculation to use. Further, the distortion measurement block 90 may also receive the operational parameters 96 of the electronic display 12 to assist in the determination of which distortion measurement calculation to use. For example, the distortion measurement block 90 may receive an indication that the battery life 96D of the electronic display 12 is low. Such an indication may influence the distortion measurement block 90 to proceed with a lower-cost calculation 94 and a decreased clock rate as a power saving decision.

Once the distortion measurement block 90 selects between the higher-cost calculation 92 and the lower-cost calculation 94, a mode selection function 106 of the mode decision block 58 selects between encoding the input video data 100 using an inter-frame prediction mode or an intra-frame prediction mode. To accomplish this selection, the mode selection function 106 selects the inter-frame prediction mode or intra-frame prediction mode based on which of the two modes spends the fewest bits while achieving the highest fidelity encoded image. The selected distortion measurement calculation may provide the indication as to whether the inter-frame prediction mode or intra-frame prediction mode provides the greatest fidelity while spending the fewest bits for each specific prediction block 80 of the input video data 100.

Once the inter-frame or intra-frame prediction mode is selected at the mode selection function 106, the input video data 100 is encoded at the encoding block 102 using the selected prediction mode. It may be appreciated that the input video data 100 may be subdivided into several prediction units 80 of various sizes, as discussed above in relation to FIG. 7. Accordingly, each of the prediction units 80 may be encoded using different prediction modes based on the qualities of the input video data 100. For example, one prediction block 80 of the input video data may be encoded using the inter-frame prediction mode while another prediction block 80 of the input video data 100 may be encoded using the intra-frame prediction mode.

Once the input video data 100 is encoded via the encoding block 102, compressed output video data 108 may be transmitted to other electronic devices, a network, or storage. By compressing the input video data 100, fewer resources are expended in transmitting or storing the compressed output video data 108. This may result in increased transmission and storage efficiency. Further, using fewer resources to transmit the compressed output video data 108 may enhance real-time display of reconstructed video data at a destination electronic device.

Figure 10A:
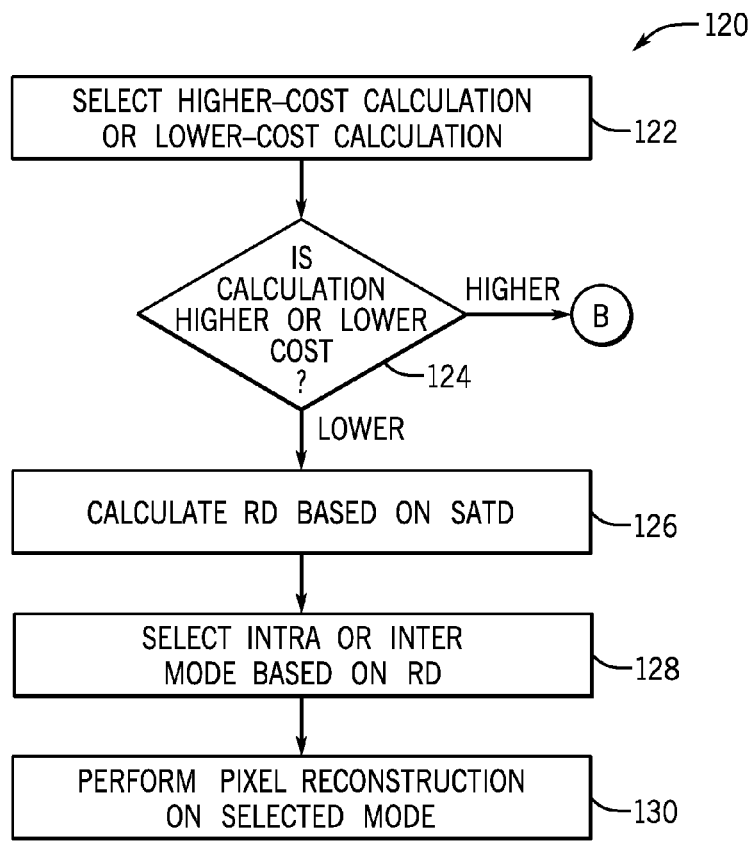
FIGS. 10A and 10B are flow diagrams of a dynamic mode decision to encode video data, in accordance with an embodiment.
Figure 10B:
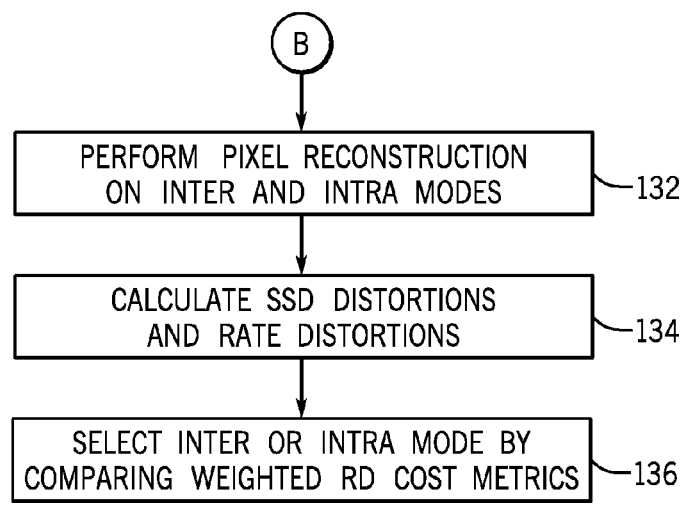

Turning now to FIGS. 10A and 10B, a flow diagram 120 of a distortion measurement selection and mode decision is illustrated. Initially, at block 122, the distortion measurement block 90 selects between the higher-cost calculation 92 and the lower-cost calculation 94 used in selecting between the inter-frame prediction mode and the intra-frame prediction mode. As discussed above in the discussion of FIG. 8, the distortion measurement block 90 makes a selection based on the operational parameters 96. The operational parameters 96 may provide indications of parameters of both the electronic display 12 and the image data. Further, the operational parameters 96 may dynamically alter how the distortion measurement block 90 determines which of the higher-cost calculation 92 and the lower-cost calculation 94 are selected. For example, as the battery life 96D of the computing device 10 decreases, the distortion measurement block 90 may alter selection criteria in such a manner that the lower-cost calculation 94 is more likely to be used than during similar conditions with the battery life 96D closer to a full charge.

Subsequently, at block 124, an indication is provided by the distortion measurement block 90 to the mode decision block 58 as to whether the higher-cost calculation 92 or the lower-cost calculation 94 was selected. If the lower-cost calculation 94 is selected (e.g., when real-time performance is demanding), then, at block 126, rate distortion cost metrics are calculated based on the sum of absolute transformed differences (SATD). As mentioned above, the SATD uses a Hadamard transform applied to differences between predicted pixels and the original pixels prior to a summation of the absolute values over a coding block. Because coefficient bit costs are partially counted in the SATD, a rate estimation using the SATD based rate distortion cost metrics may consider only bits used in coding mode information and not quantized transform coefficients. This may result in a less accurate rate estimation that a rate estimation based on a sum of squared differences (SSD).

After determining the rate distortion cost metrics based on the SATD, at block 128, the intra-frame prediction or inter-frame prediction modes are selected based on the rate distortion cost metric. For example, the rate distortion cost metric may provide an indication that characteristics of the image data may result in greater fidelity and a reduced bit cost when compressing the image data with the inter-frame prediction mode as opposed to the intra-frame prediction mode. Alternatively, the rate distortion cost metric may provide an indication that the characteristics of the image data may result in greater fidelity and a reduced bit cost when compressing the image data with the intra-frame prediction mode as opposed to the inter-frame prediction mode.

In either instance, at block 130, a pixel reconstruction process is applied after the mode decision of block 128 to produce the encoded image data. Because the pixel reconstruction process occurs after the mode decision, the pixel reconstruction process is applied to only the inter-frame mode or the intra-frame mode and not both. In this manner, any pipeline latency resulting from the pixel reconstruction process for both the inter-frame mode and the intra-frame mode, as in the higher-cost calculation 92, is avoided. For example, the reconstruction functions including transform, quantization, inverse quantization, and inverse transform are only applied to the mode selected at block 128.

On the other hand, as shown in FIG. 10B, after the higher-cost calculation 92 is selected at block 122 and indicated by block 124, the pixel reconstruction process is performed on both the inter-frame prediction mode and the intra-frame prediction mode, at block 132. This may occur when the real-time performance of the image data is not demanding. The pixel reconstruction process is performed on both of the prediction modes because the higher cost calculation 92 (e.g., the sum of squared differences (SSD)) uses the reconstructed pixels as a portion of the distortion measurement instead of the predicted pixels used during the lower cost calculation 94 (e.g., the SATD process). Accordingly, the higher-cost calculation 92 may result in the mode decision block 58 performing the reconstruction functions including transform, quantization, inverse quantization, and inverse transform on both the inter-frame prediction mode and the intra-frame prediction mode.

Subsequently, at block 134, the SSD distortion measurements and rate distortion cost metrics for the inter-frame prediction mode and the intra-frame prediction mode are calculated. The decision criteria to select either the inter-frame prediction mode or the intra-frame prediction mode for each prediction block 80 may originate from weighted rate distortion cost metrics. For example the weighted rate distortion cost metrics may be calculated using Equation 1 provided in the discussion of FIG. 6. In Equation 1, the weighted rate distortion cost metric associated with a prediction mode configuration may equal a weighted rate expected to be used to indicate the source image data in addition to the SSD distortion measurement.

Next, at block 136, the inter-frame prediction mode or the intra-frame prediction mode is selected by comparing the weighted rate distortion cost metrics for the two modes. For example, whichever mode has a smaller weighted rate distortion cost metric may be selected for use when encoding the image data. It may be appreciated that because the pixel reconstruction process is applied to both the intra-frame prediction mode and the inter-frame prediction mode, the timing costs associated with the higher-cost calculation 92 may be greater than the timing costs associated with the lower-cost calculation 94. Because of this, an increase in latency of the video encoding pipeline 34 may result in increased power consumption to meet real-time performance parameters of more demanding image data. For example, the clock rate of the computing device 10 may be increased to meet the real-time performance parameters.

Further, it may be appreciated that that the above described technique for selecting between the inter-frame prediction mode and the intra-frame prediction mode may also be used for encoding a similar format of video at different power usage modes. For example, when the clock rate of the computing device 10 is reduced during a low power usage mode, a cycle budget to achieve real-time encoding decreases. Accordingly, the SATD based rate distortion metrics may be applied by the distortion measurement block 90 in determining which of the inter-frame prediction mode or the intra-frame prediction mode is selected regardless of the demands of the image data.

Furthermore, while the technique is described as being implemented using a real-time HEVC video encoding standard, it may also be applicable to other existing video encoding standards (e.g., AVC or MPEG-2), and the technique may also be applicable to future video encoding standards where a coding mode decision is made for a real-time encoder with different possible rate distortion metrics that result in differing effects on latency of the video encoding pipeline 34. Moreover, the above described technique may also be applied to mode decisions other than the inter-frame prediction mode and the intra-frame prediction mode. For example, the technique may be used for intra mode direction or partitions of an inter prediction unit.

Accordingly, the technical effects of the present disclosure include improving operational efficiency of the video encoding pipeline 34 used to encode (e.g., compress) source (e.g., uncompressed) image data. In some embodiments, the video encoding pipeline 34 may use the higher-cost calculation 92 or the lower-cost calculation 94 when determining a prediction mode used to encode the image data. In this manner, the video encoding pipeline 34 may dynamically select the higher or lower-cost calculations 94 and 94 based on the operational parameters 96 of the computing device 10 and/or the source image data. Accordingly, the video encoding pipeline 34 may efficiently achieve and maintain real-time video encoding as the operational parameters 96 change without changing individual functions in the pixel reconstruction process.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. An encoding pipeline configured to encode image data, comprising:
   mode decision circuitry configured to determine a frame prediction mode, the mode decision circuitry comprising:
     distortion measurement circuitry configured to select a distortion measurement calculation based at least in part on operational parameters of a display device and the image data, wherein the distortion measurement calculation comprises a higher-cost calculation when the encoding pipeline is capable of encoding the image data at or near real time, or comprises a low-cost calculation when the encoding pipeline is not capable of encoding the image data at or near real time and wherein whether the encoding pipeline is capable of encoding the image data at or near real time depends at least in part on the operational parameters; and
   mode selection circuitry configured to:
     determine rate distortion cost metrics associated with an inter-frame prediction mode and an intra-frame prediction mode using the distortion measurement calculation; and
     select between the inter-frame prediction mode and the intra-frame prediction mode based at least in part on the rate distortion cost metrics.

2. The encoding pipeline of claim 1, wherein the distortion measurement calculation comprises a sum of squared differences or a sum of absolute transformed differences.

3. The encoding pipeline of claim 2, wherein the higher-cost calculation comprises the sum of squared differences.

4. The encoding pipeline of claim 2, wherein the low-cost calculation comprises the sum of absolute transformed differences.

5. The encoding pipeline of claim 2, wherein the mode selection circuitry is configured to perform pixel reconstruction on the inter-frame prediction mode and the intra-frame prediction mode when the distortion measurement circuitry selects the sum of squared differences.

6. The encoding pipeline of claim 2, wherein the mode selection circuitry is configured to perform pixel reconstruction on the inter-frame prediction mode or the intra-frame prediction mode depending on which of the inter-frame prediction mode or the intra-frame prediction mode is selected by the mode selection circuitry.

7. The encoding pipeline of claim 1, wherein the the operational parameters of the display device comprise a power mode of the encoding pipeline.

8. A tangible, non-transitory, computer-readable medium configured to store instructions executable by one or more processors, wherein the instructions comprise instructions to:

determine, using the one or more processors, a distortion measurement calculation based on operational parameters of image data, wherein the distortion measurement calculation comprises a higher-cost calculation when the one or more processors are capable of encoding the image data at or near real time, or comprises a low-cost calculation when the one or more processors are not capable of encoding the image data at or near real time;

determine, using the one or more processors, rate distortion cost metrics of an inter-frame prediction mode and an intra-frame prediction mode using the distortion measurement calculation;

select, using the one or more processors, the inter-frame prediction mode or the intra-frame prediction mode based on the rate distortion cost metrics; and encode, using the one or more processors, the image data using the inter-frame prediction mode or the intra-frame prediction mode selected by the one or more processors.

9. The computer-readable medium of claim 8, wherein the distortion measurement calculation comprises a sum of squared differences or a sum of absolute transformed differences, and the operational parameters comprise a resolution and a frame rate of the image data.

10. The computer-readable medium of claim 8, wherein the instructions comprise instructions to transmit, using the one or more processors, encoded image data to a memory or an electronic display.

11. The computer-readable medium of claim 10, wherein the distortion measurement calculation is determined based at least in part on operational parameters of the electronic display.

12. The computer-readable medium of claim 11, wherein the operational parameters of the electronic display comprise thermal limits, battery life, power mode, or any combination thereof.

13. The computer-readable medium of claim 8, wherein the instructions are configured to dynamically alter, using the one or more processors, the distortion measurement calculation to maintain a high efficiency video encoding real-time standard while the image data is encoded.

14. An encoding pipeline comprising:

memory configured to store source image data corresponding with an image frame to be encoded by the encoding pipeline, wherein the source image data is divided into a plurality of prediction blocks;

distortion measurement circuitry configured to select between a sum of squared differences calculation and a sum of absolute transformed differences calculation based at least in part on operational parameters of a display device and the source image data;

mode selection circuitry configured to determine rate distortion cost metrics associated with at least two frame prediction modes using the sum of squared differences calculation when the encoding pipeline is capable of encoding the source image data at or near real time or the sum of absolute transformed differences calculation when the encoding pipeline is not capable of encoding the source image data at or near real time, and to select one of the at least two frame prediction modes based at least in part on the rate distortion cost metrics;

encoding circuitry configured to encode the plurality of prediction blocks using the one of the at least two frame prediction modes selected by the mode selection circuitry; and an output configured to receive a plurality of encoded prediction blocks and to transmit the plurality of encoded prediction blocks in real-time or near real-time to the display device.

15. The encoding pipeline of claim 14, wherein the at least two frame prediction modes comprise an inter-frame prediction mode and an intra-frame prediction mode.

16. The encoding pipeline of claim 14, wherein the plurality of prediction blocks comprise 64 pixel by 64 pixel, 32 pixel by 32 pixel, or 16 pixel by 16 pixel units.

17. The encoding pipeline of claim 14, wherein the distortion measurement circuitry is configured to select only the sum of absolute transformed differences calculation when the encoding pipeline is in a power saving mode.

18. The encoding pipeline of claim 14, comprising a clock, wherein performance of the encoding circuitry depends on a clock rate of the clock, and wherein the clock rate is increasable to meet a real-time performance parameter of the encoding pipeline when the encoding pipeline is not in a power saving mode.

19. The encoding pipeline of claim 15, wherein the mode selection circuitry is configured to perform pixel reconstruction on the inter-frame prediction mode and the intra-frame prediction mode when the distortion measurement circuitry selects the sum of squared differences calculation, and wherein the mode selection circuitry is configured to perform pixel reconstruction on only a selected one of the inter-frame prediction mode and the intra-frame prediction mode when the distortion measurement circuitry selects the sum of absolute transformed differences calculation.

* * * * *